United States Patent
Sert Alagaç et al.

(10) Patent No.: US 10,343,225 B2
(45) Date of Patent: Jul. 9, 2019

(54) MONOLITHIC CERAMIC END MILL CUTTER SET HAVING A HELIX ANGLE IN THE INTERVAL OF 28° TO 43°

(71) Applicant: ALP HAVACILIK SANAYI VE TICARET ANONIM SIRKETI, Odunpazari/Eskisehir (TR)

(72) Inventors: Melike Sert Alagaç, Odunpazari/Eskisehir (TR); Ugur Evrensel Yilmaz, Odunpazari/Eskisehir (TR)

(73) Assignee: ALP HAVACILIK SANAYI VE TICARET ANONIM SIRKETI, Odunpazari/Eskisehir (TR)

( * ) Notice: Subject to any disclaimer, the term of this patent is extended or adjusted under 35 U.S.C. 154(b) by 0 days.

(21) Appl. No.: 15/567,064

(22) PCT Filed: Aug. 1, 2016

(86) PCT No.: PCT/TR2016/050252
§ 371 (c)(1),
(2) Date: Oct. 16, 2017

(87) PCT Pub. No.: WO2017/099682
PCT Pub. Date: Jun. 15, 2017

(65) Prior Publication Data
US 2018/0133810 A1    May 17, 2018

(30) Foreign Application Priority Data
Dec. 9, 2015    (TR) .............................. a 2015 15785

(51) Int. Cl.
*B23C 5/16*    (2006.01)
*B23C 5/10*    (2006.01)

(52) U.S. Cl.
CPC ........ *B23C 5/10* (2013.01); *B23C 2210/0485* (2013.01); *B23C 2210/203* (2013.01);
(Continued)

(58) Field of Classification Search
CPC ...... B23C 2210/0485; B23C 2210/203; B23C 2210/40; B23C 2210/03; B23C 5/10; B23C 2226/18
See application file for complete search history.

(56) References Cited

U.S. PATENT DOCUMENTS 6,007,276 A * 12/1999 Wardell ................... B23C 5/10
                                                                     407/54
9,227,253 B1 *  1/2016 Swift ....................... B23C 5/28
(Continued)

FOREIGN PATENT DOCUMENTS

| CN | 102 303159 B | 1/2013 |
| JP | H 02180517 A | 7/1990 |

OTHER PUBLICATIONS

International Search Report dated Dec. 8, 2016 for corresponding International Application No. PCT/TR2016/050252.
(Continued)

*Primary Examiner* — Willmon Fridie, Jr.
(74) *Attorney, Agent, or Firm* — Intellectual Property Law Group LLP

(57) ABSTRACT

The invention is a monolithic end-mill cutter set (A) that can be made of ceramic and/or other materials having high strength and toughness and comprising a shank part (B) along a longitudinal axis (4) and a cutter part (C), comprising: a cutting diameter (1) varying between 2 to 20 mm, at least one web thickness (18) found at a blade (26) part, at least one helix angle (10) having a cutting edge (13) thereon, a core diameter (16) that is at least 0.7 times the cutting diameter (1), at least one corner radius (5) found at the tip
(Continued)

part of the blades (26) between the flutes (9) and axial and positive radial rake angles (17) at which cutting operation is made. It has a wide helix angle interval and a positive rake angle. Titanium Aluminum Nitride TiAlN coating can be made on the monolithic end-mill cutter set (A) via PVD coating method in order to extend the service life of the end-mill cutter set (A), increase the abrasion resistance, and minimize the problem of sticking of rake on the cutter set (joining).

9 Claims, 4 Drawing Sheets

(52) U.S. Cl.
CPC .... *B23C 2210/205* (2013.01); *B23C 2210/40* (2013.01); *B23C 2224/24* (2013.01); *B23C 2226/18* (2013.01); *B23C 2228/08* (2013.01); *B23C 2228/10* (2013.01)

(56) References Cited

U.S. PATENT DOCUMENTS

| | | | | |
|---|---|---|---|---|
| 2004/0120777 | A1* | 6/2004 | Noland | B23C 5/10 407/63 |
| 2007/0248422 | A1* | 10/2007 | Song | B23C 5/10 407/54 |
| 2007/0286691 | A1* | 12/2007 | Glimpel | B23C 5/10 407/54 |
| 2007/0297864 | A1* | 12/2007 | de Boer | B23C 5/10 407/54 |
| 2009/0185878 | A1* | 7/2009 | Turrini | B23C 5/10 409/132 |
| 2014/0255113 | A1* | 9/2014 | Davis | B23C 5/10 407/54 |
| 2017/0144234 | A1* | 5/2017 | Shpigelman | B23C 5/10 |
| 2017/0304910 | A1* | 10/2017 | Suehara | B23C 5/10 |
| 2017/0341162 | A1* | 11/2017 | Watanabe | B23C 5/10 |

OTHER PUBLICATIONS

Written Opinion of the ISA dated Dec. 8, 2016 for corresponding International Application No. PCT/TR2016/050252.

* cited by examiner

MONOLITHIC CERAMIC END MILL CUTTER SET HAVING A HELIX ANGLE IN THE INTERVAL OF 28° TO 43°

CROSS-REFERENCE TO RELATED APPLICATIONS

This application is a U.S. National Phase application, under 35 U.S.C. § 371, of International Application no. PCT/TR2016/050252 with an international filing date of Aug. 1, 2016, and claims benefit of Turkish Application no. 2015/15785 filed on Dec. 9, 2015, and which are hereby incorporated by reference for all purposes.

BACKGROUND

1. Field of Invention

The present invention relates to monolithic end-mill cutter sets that can be made of ceramic or any other material having high strength and toughness.

The invention particularly relates to a monolithic ceramic end-mill cutter set produced in a wide helix angle interval.

2. Background Art

In the known status of the art, end mills are used in machining of various materials such as metal to plastic via rotational motion. Cylindrically-shaped end mills are formed of a stem part fixed at the tool holder and a cutting end part shaping the material. The cutting end part has a plurality of blades and these blades are separated from each other via flutes (rake channels) for the purpose of removing the rakes formed during machining. The blades and flutes can be parallel to the longitudinal axis of the end mill or can be helical with regard to this axis.

Nowadays, in parallel with the rapid development of aviation industry, there is more and more work potential in the field of machining superalloys. Since superalloys have different characteristics from other alloys in that they can endure high mechanical stresses at high temperatures and resist against changes in their surface structures, they are more commonly used in aviation and space industry. SiAlON-based ceramics, as one of these kinds of alloys, provide potential solution for milling operations of super alloys, since they have perfect thermomechanical characteristics and their production methods are suitable for obtaining complex geometries such as end mill sets. Besides superalloys, for materials having high hardness such as steel and other similar materials, ceramic cutter sets can be produced in various geometries according to the characteristics of the material to be processed, and thus have the potential to form a solution for difficult production processes.

SiAlON milling cutter sets provide great improvements in cutting speeds in superalloy milling, which is one of the harder machining processes in aviation industry. Use of SiAlON ceramics in super alloy processing operations in monolithic milling cutter set forms is a quite new technology and have not become widespread internationally.

Super alloy cutting speed using carbide milling cutter sets is about 30 meters per minute. At high cutting speeds in High Speed Machines, monolithic SiAlON milling cutter sets having high abrasion resistance provide 20 times increase in cutting speed and 5-6 times increase in material removal volume (rake flow) in unit time compared to carbide based end-mill cutter sets. This allows significant reduction in processing costs and increase in general operational efficiency and ensures dramatic increase in profitability and competitiveness in international market.

In milling of such materials with high strength and toughness that are hard to perform machining on, milling cutter tool holder sets with ceramic insert are also used. Milling cutter tool holder sets with ceramic insert are hard to manufacture under a certain diameter. Moreover, since these sets can only work about 3-6 minutes, their inserts are required to be changed regularly. In machining of materials with high hardness with such sets, saving cannot be achieved from time when insert changing time periods are considered. Due to their performance/cost superiority on carbide cutter sets in small scaled set requirements, they have quite high potential for international marketing as an innovative and competitive product. They provide very high improvements in terms of time by being manufactured with various helix angles, not only being used with nickel-based materials, and also being used with different type of materials that have high strength and toughness, and are difficult to perform machining on.

In a patent research made about this subject, a patent with Publication No. US20140255113 is encountered. Said invention relates to a single-piece end-mill cutter set and machining methods of such end-mill cutter sets. In the abstract part of the invention: "End mills are disclosed which may be made monolithically of ceramic or other materials. The cutting portions of the end mills have lengths of cut that are no more than twice their cutting diameters and cores which are at least 0.7 times their cutting diameters. Their axial blades have cutting edges with negative radial rake and are separated by helical flutes. Their cutting ends have negative axial rake and are gashed ahead of center and have radial cutting edges with negative rake. Such end-mill cutter sets also have radius corners and gashes transitioning from radial to axial at a flute. Methods of milling materials using such ceramic end mills are also disclosed."

The end-mill cutter set disclosed in the abstract part of the above given invention has a narrow helix angle interval and is only used in machining of nickel alloys. Besides, the ceramic milling cutter set does not have a surface coating. By making the coating, the joining problem on the cutter set (sticking of rake on the cutter set) encountered during machining is reduced and the service life of the set is improved. As a result, improvement is to be made in end-mill cutter sets, and therefore novel embodiments that would eliminate the above said drawbacks and bring solutions to the problems of the prior art systems are needed.

SUMMARY

The invention relates to a end-mill cutter set, which meets the above said requirements, eliminates all of the disadvantages, and brings some additional advantages.

A purpose of the invention is to produce monolithic end-mill cutter sets with wider helix angle intervals and positive cutting angles with regard to the prior art products.

Another purpose of the invention is to use monolithic end-mill cutter sets in machining of other materials with high strength and toughness, besides machining of nickel alloy superalloys.

With the invention, it is possible to perform Titanium Aluminium Nitride (TiAlN) coating application on the SiAlON ceramic end-mill cutter set via PVD coating method. In this way, it is aimed to extend the expected life of the set, increased abrasion resistance and minimize the sticking problem of rakes on the cutting set. The cutter set according to the invention can also be produced without coating.

In the monolithic end-mill cutter set according to the invention, along the longitudinal axis, the helical structure found at the edges of the blades continues helically along the longitudinal direction and ends at the web thickness at the blade part.

In the monolithic end-mill cutter set according to the invention, helix length is between about 1 to 2 times of the cutting diameter.

In the monolithic end-mill cutter set according to the invention, the number of blades can be between 2 to 8, depending on the cutting diameter.

In the monolithic end-mill cutter set according to the invention, the corner radius is between 0.01 to 0.4 times the cutting diameter of the cutting set.

In the monolithic end-mill cutter set according to the invention, the helix angle varies from 28° to 43°, depending on the characteristics of the material to be machined and the cutting parameters.

In the monolithic end-mill cutter set according to the invention, radial rake angle is between 0° to +5°.

In the monolithic end-mill cutter set according to the invention, axial rake angle is between −3° to +5°.

In the monolithic end-mill cutter set according to the invention, gash angle is between 15° to 45°.

In the monolithic end-mill cutter set according to the invention, the angle found at the rake angle ending point of the front part (end rake) is between −6° to +6°.

In the monolithic end-mill cutter set according to the invention, the front dish angle at the opening part of the flutes is between 1° to 3°.

In order to achieve the above said purposes which would be understood better with the below given detailed description, the present invention is a monolithic end-mill cutter set (A) that can be made of ceramic or other materials having high strength and toughness and comprising a shank part (B) along a longitudinal axis (4) and a cutter part (C), comprising:

a cutting diameter varying between 2 to 20 mm along the diameter length, at least one web thickness found at a blade part, at least one helix angle having a cutting edge thereon, a core diameter that is at least 0.7 times the cutting diameter (1), at least one corner radius found at the tip part of the blades between the flutes and axial and positive radial rake angles at which cutting operation is made.

The structural and characteristic features of the invention and all of its advantages shall be understood better with the figures and the detailed description given below in reference to the figures, and therefore, the assessment should be made by taking into account the said figures and detailed explanations.

BRIEF DESCRIPTION OF THE DRAWINGS

For better understanding of the embodiment of the present invention and its advantages with its additional components, it should be evaluated together with below described figures.

REFERENCE NUMBERS

Figure 1:
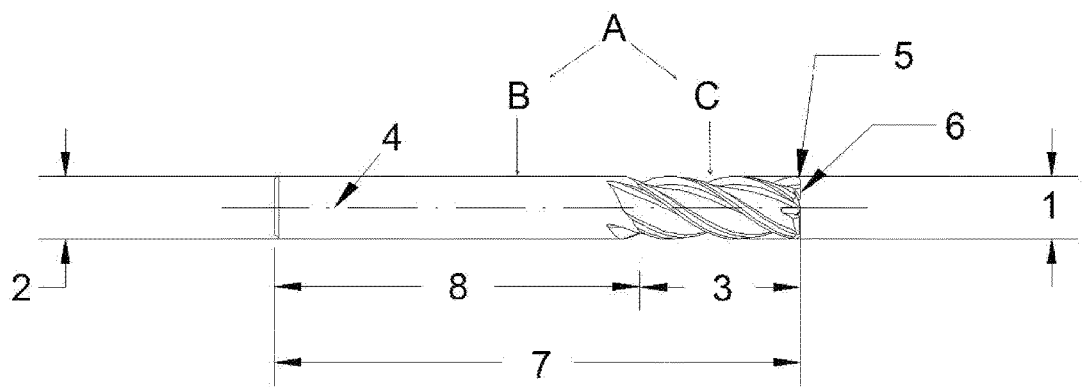
FIG. 1; is the side profile view of the 4-blade embodiment of the monolithic end-mill cutter set according to the invention.

A: End-mill cutter set
B: Shank part
C: Cutter part
1. Cutting diameter
2. Shank diameter
3. Helix length
4. Longitudinal axis
5. Corner radius
6. Cutting end
7. Total length
8. Shank length
9. Flute
10. Helix angle
11. Primary relief angle
12. Secondary relief angle
13. Cutting edge
14. Width of primary relief land
15. Width of secondary relief land
16. Core diameter
17. Radial rake angle
18. Web thickness
19. Axial primary relief angle
20. Axial secondary relief angle
21. Radial primary relief angle
22. Radial secondary relief angle
23. Dish angle
24. Gash angle
26. Blades
27. Cutting edge tangent
28. End rake

DETAILED DESCRIPTION OF THE INVENTION

In this detailed description, the preferred embodiments of the end-mill cutter set (A) according to the invention are only disclosed for better understanding of the subject without forming any limiting effect.

The present invention relates to monolithic end-mill cutter sets (A) that can be made of ceramic or such other materials having high hardness and toughness and to machining methods of such end-mill cutter sets (A). The improvement provided with the invention is production of end-mill cutter set (A) with a wide helix angle (10) and additionally, extending the expected life of the end-mill cutter set (A), improving its abrasion resistance, and making Titanium Aluminium Nitride (TiAlN) coating via PVD coating method in order to minimize sticking of rakes on the end-mill cutter set (A).

Figure 2:
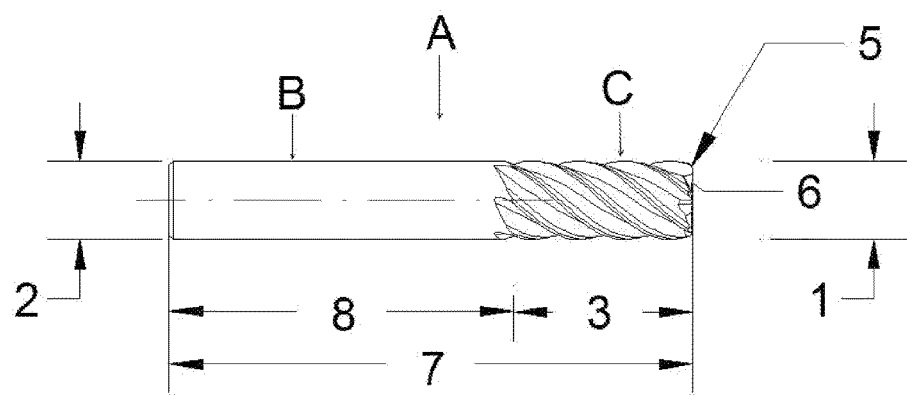
FIG. 2; is the side profile view of the 6-blade embodiment of the monolithic end-mill cutter set according to the invention.
Figure 8:
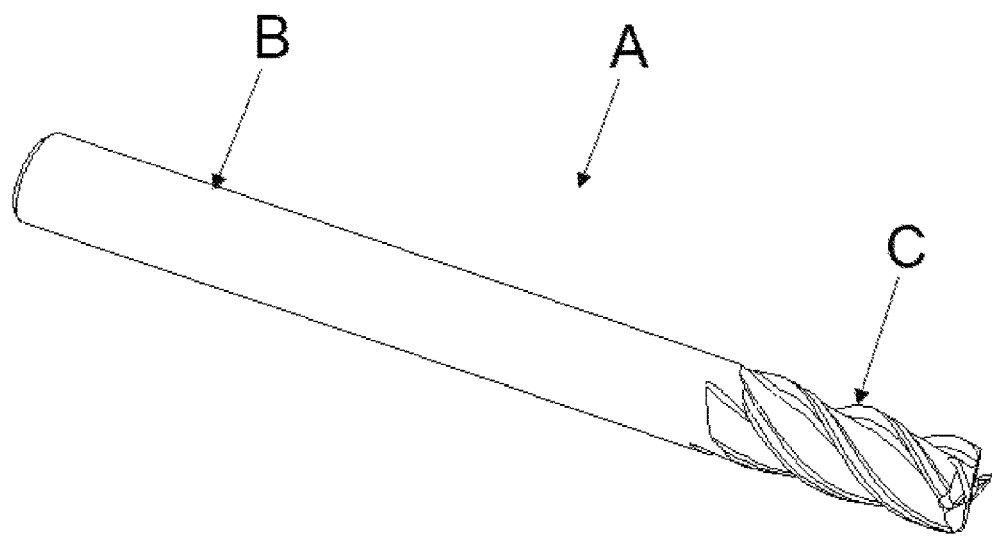
FIG. 8; is a three-dimensional view of a preferred embodiment of the monolithic end-mill cutter set according to the invention.

FIG. 1 shows the side profile view of the preferably 4-flute embodiment of the monolithic end-mill cutter set (A) according to the invention, while FIG. 2 shows the side profile view of the preferably 6-flute embodiment. The end-mill cutter set (A) basically consists of a shank part (B) fixed to the tool holder and a cutter part (C) processing the material surface via rotational motion. The end-mill cutter set (A) has a cylindrical form with a longitudinal axis, and it is produced monolithically from a ceramic material called SiAlON. FIG. 8 shows a three-dimensional view of a preferred embodiment of the monolithic end-mill cutter set (A) according to the invention.

As can be seen from FIGS. 1 and 2, the SiAlON monolithic end-mill cutter set (A) has a cutting diameter (1) comprising blades (26) along the longitudinal axis (4) of its cylindrical body, and a diameter of the shank diameter (2) that is fixed to the holder. While the cutting diameter (1) varies between 2 to 20 mm, the helix length (3) defining the cutting length can be between 1 to 2 times of the cutting diameter (1).

The total length (7) of the end-mill cutter set (A) is equal to the summation of the helix length (3) and the shank length (8). At the tip of the cutter part (C), cutting end (6) and the corner radius (5) structures shown in FIG. 1 are found.

The shank diameter (2) and the cutting diameters (1) can be same or different from each other in the end-mill cutter set (A). The adjacent blades (26) arranged on the helix angle (10) of the end-mill cutter set (A) are separated from each other via flute (9) grooves. The blades (26) extending along the longitudinal axis (4) end at the end-mill cutter set (A) cutting end (6).

The core diameter (16) of the end-mill cutter set (A) can be about 0.70-0.75 times the cutting diameter (1). The blades (26) have a radial rake angle (17) where cutting operation is made and an axial rake angle. The radial rake angle (17) has a positive angle.

Figure 3:
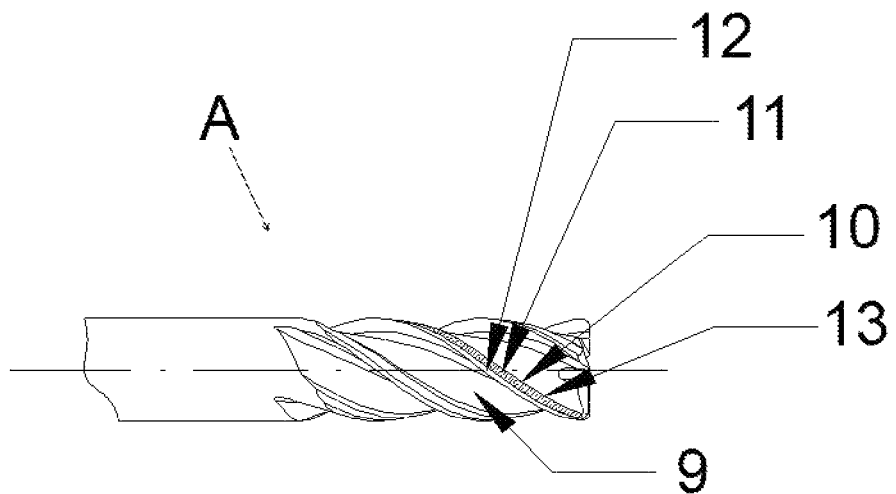
FIG. 3; is the side profile view of the monolithic end-mill cutter set according to the invention; showing the cutting edges, blades, primary relief angle adjacent to the helix angle and the secondary relief angle.
Figure 4:
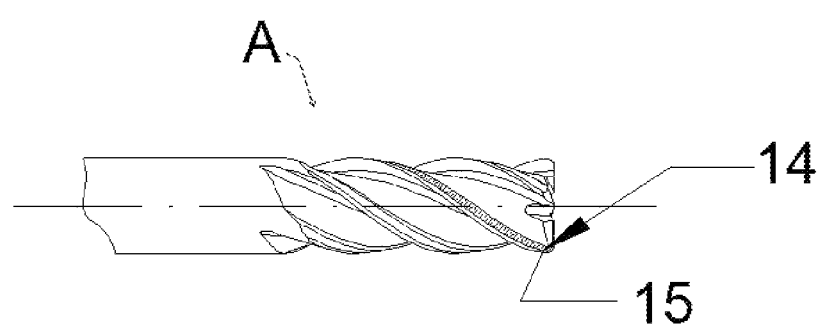
FIG. 4; is the side profile view of the monolithic end-mill cutter set according to the invention; showing the width of primary relief land and axial width of secondary relief land.

In the side profile view of the monolithic end-mill cutter set (A) according to the invention given in FIG. 3; the cutting edges (13), 2 to 8 blades, or in other words flutes (9), the primary relief angle (11) adjacent to the helix angle (10), and the secondary relief angle (12) can be seen. In FIG. 4, the width of axial primary relief land (14) and the width of axial secondary relief land (15) corresponding to the primary relief angle (11) and the secondary relief angle (12), respectively, are shown.

Figure 5:
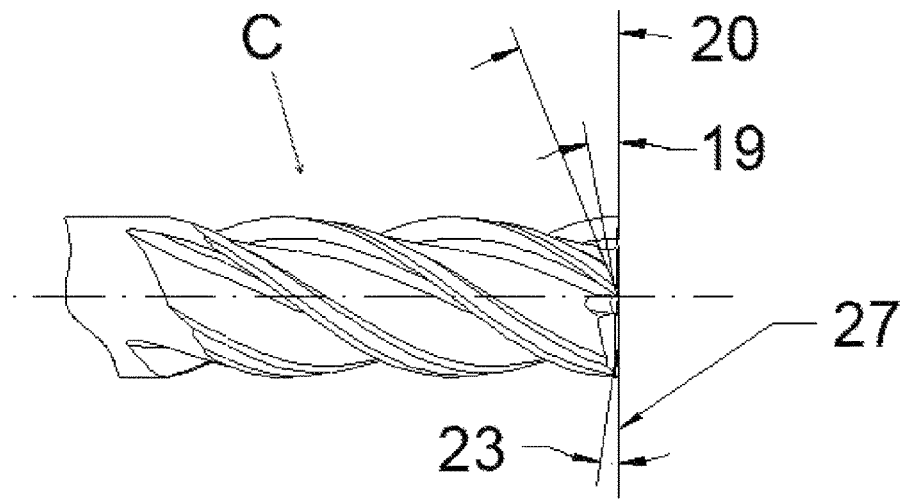
FIG. 5; is the side profile view of the monolithic end-mill cutter set according to the invention; showing the axial primary relief angle, axial secondary relief angle, and the dish angle dimensioned according to the plain surface that is tangent to the cutting end.

In FIG. 5, the axial primary gap angle (19), the axial secondary gap angle (20), and dish angle (23) dimensioned according to the cutting edge tangent (27) (cutting edge tangent) that is tangent to the cutting end (6) in the front part of the end mill (A) are shown.

Figure 6:
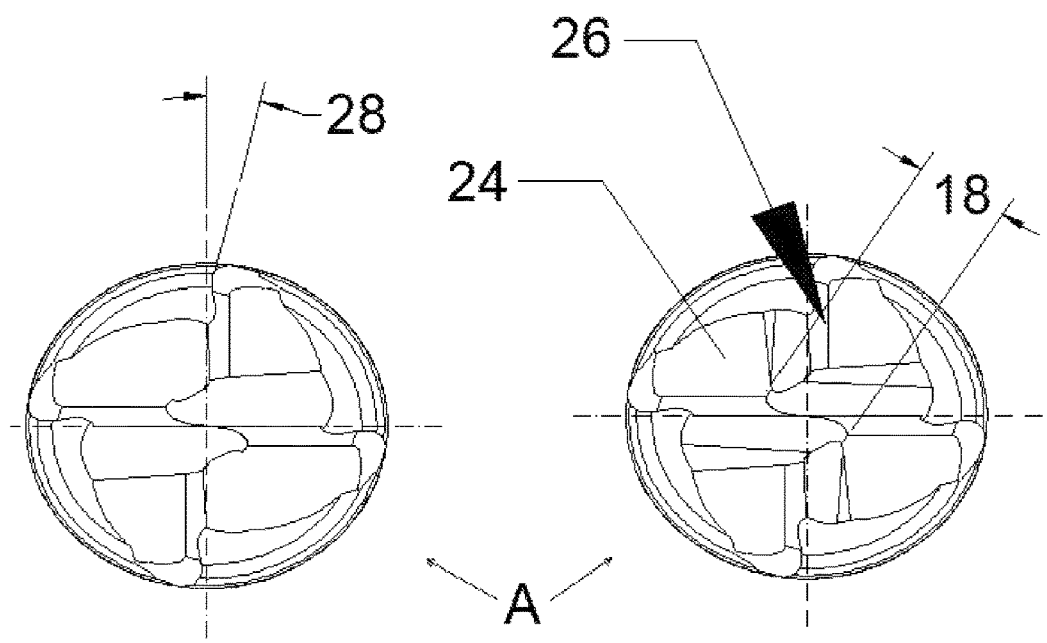
FIG. 6; is the view of the front part of the monolithic end-mill cutter set according to the invention; showing the web thickness, gash angle, pods and end rake.

In the view of the front part of the monolithic end-mill cutter set (A) according to the invention, given in FIG. 6; the web thickness (18) corresponding to the gap between the flutes (9) found at the cutting end (6), the gash angle (24) corresponding to the angle found at the sides of the blades (26) found at each helix angle (10), and the number of the flutes (9) found at the ends can be seen. FIG. 6 also shows the end rake (28) indicating the end of the radial rake angle (17).

Figure 7:
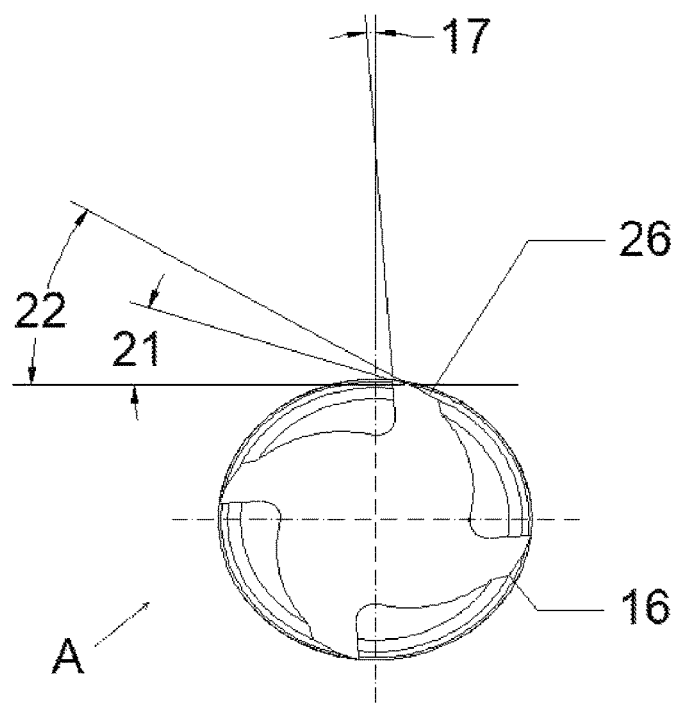
FIG. 7; is the front profile view of the front part of the monolithic end-mill cutter set according to the invention; showing the radial primary relief angle and radial secondary relief angles found beside the blade helix angle, the core diameter, and the radial rake angle.

In the front profile view of the front part of the monolithic end-mill cutter set (A) according to the invention, given in FIG. 7; the radial primary relief angle (21) and radial secondary relief angles (22) found beside the blade (26) helix angle (10) can be seen.

The end-mill cutter set (A) according to the invention:
The length of the cutter part (C), which has a helix length (3) that is one to two times the cutting diameter (1), is shorter than the shank length (8) of the shank part (B),
The core diameter (16) is at least 0.7 times the cutting diameter (1),
The helix angle (10) is between 28° to 43° around its axis.
The number of flutes (9) are between 2 to 8.
The end rake (28) of the rake angle is between −6° to +6° interval.
The corner radius (5) is about 0.010-0.4 times the cutting diameter (1).
Radial rake angle (17) is between 0° to +6°.
Axial rake angle is approximately between −3° to +5°.
The dish angle (23) varies between 1° to 3°.
The gash angle (24) is between 15° to 45° interval.
Moreover, the cutting diameter (1) is preferred to remain constant along the helix length (3), but it can also be tapered along the helix length (3).
The cutting diameter (1) can have diameters varying between 2 to 20 millimeters and the number of flutes (9) may increase as the cutting diameter (1) increases.

In the end-mill cutter set (A) according to the invention, Silisium Nitride ($Si_3N_4$) based ceramics, alumin-added silisium carbide whisker, silisium carbide, alpha/beta (20:80 to 80:20) SiAlON ($Si3N4+Al_2O_3+AlN+Y_2O_3+Sm_2O_3+CaCO_3$), $Al_2O_3$ can be used as ceramic material.

The operation steps for the production of the end-mill cutter set (A) according to the invention are as follows:
SiAlON material is brought into a rod form via sintering methods.
The diameter of the rod-shaped ceramic material is machined.
Diameter machined rod material is brought into milling cutter form via channel machining.
The end-mill cutter set (A) is subjected to corner rounding finishing operation in order to eliminate the micro cracks found at the helix edges.
Coating is made on the cutter set, but it can also be used without coating.

During milling operation, the problem of the removed rake joining on the ceramic cutter tip surface (sticking of rake on the cutting set) due to formation of high temperature on the surface of the piece is encountered. PVD TiAlN coating is made in order to extend the service life of the ceramic end-mill cutter set (A) and minimize the sticking problem of rakes on the cutting set.

It is known that the AlN phase having hexagonal lattice structure provides better sticking on the ceramic material surface than the cubical lattice TIN phase. This means that interatomic bonds are formed between the TiAlN coating and the ceramic material. By means of the interatomic bonds, the cutter set (A) can easily be polarized during coating. Following coating, the surface hardness and surface roughness of the ceramic material is increased. As a result trials, it is found out that the rake sticking problem is reduced on the coated surface.

In test studies made at anhydrous 600 m/min cutting speed at a high speed machine, machining is performed on inkonel 718 material with the end mill set (A) according to the invention and 17.6 $cm^3$/min rake is removed from the material.

The improvements provided with the end-mill cutter set (A) according to the invention are as follows:

The cutting diameter (1) of the monolithic end-mill cutter set (A) having axial structure is between 2 to 20 mm, A web thickness (18) is found at the blade (26) part of the end-mill cutter set (A) and it has a helix angle (10) having a cutting edge (13) thereon, It has a core diameter (16) which is at least 0.7 times the cutting diameter (1), The helical structure found at the edges of the cutter flutes (9) along the longitudinal axis (4) continues in a longitudinally helical structure and ends at the web thickness (18) found at the blades (26) part, A corner radius (5) is found at the tip part of the blades (26) between the plurality of flutes (9) and axial and positive radial rake angles (17) are found where cutting operation is made, The helix length (3) indicating the cutting length is about 1 to 2 times of the cutting diameter (1), The number of flutes (9) vary between 2 to 8, depending on the milling cutter set (A) diameter, The corner radius (5) is between 0.01 to 0.4 times of the cutting diameter (1), The helix angle (10) varies from 28 to 43 degrees, depending on the characteristics of the material to be machined, The radial rake angle (17) is between 0° to +5° interval, the axial rake angle is between −3° to +5° interval, the gash angle (24) is between 15° to 45° interval, the rake angle end rake (28) found at the front part of the milling cutter set is between −6° to +6° interval, the dish angle (23) at the blade part of the flutes (9), that is to say, the pit angle is between 1° to 3°.

The tip of the end mill (A) according to the invention made of ceramic material can be used with or without coating. It is possible to produce the monolithic end-mill cutter set (A) with a wider helix angle (10) than the prior art products and to use other materials with high strength and toughness in its production, besides nickel alloys.

The invention claimed is:

1. A monolithic end-mill cutter set (A) made of ceramic and comprising a shank part (B) along a longitudinal axis (4) and a cutter part (C), characterized in that the end mill cutter set comprises:
    a cutting diameter (1) varying between 2 to 20 mm,
    at least one web thickness (18) found at a blade (26) part,
    at least one helix angle (10) having a cutting edge (13) thereon,
    a core diameter (16) that is at least 0.7 times the cutting diameter (1),
    the helix angle (10) having a range from 28 to 43 degrees, depending on characteristics of a material to be processed,
    at least one corner radius (5) found at a tip part of the blade (26) part between a plurality of flutes (9) and an axial rake angle and positive radial rake angle (17) at which a cutting operation is made;
    wherein the radial rake angle (17) is between 0° to +5° interval;
    wherein the axial rake angle is between −3° to +5° interval; and
    wherein an end rake (28) at a front part is between −6° to +6° interval.

2. The end-mill cutter set (A) according to claim 1, characterized in that, a helical structure found at edges of the plurality of flutes (9) along the longitudinal axis (4) continues in a longitudinally helical structure and ends at the web thickness (18) found at the blade (26) part.

3. The end-mill cutter set (A) according to claim 1, characterized in that, a helix length (3) is about 1 to 2 times the cutting diameter (1).

4. The end-mill cutter set (A) according to claim 1, characterized in that, a number of the plurality of flutes (9) vary between 2 to 8, depending on the cutting diameter (1).

5. The end-mill cutter set (A) according to claim 1, characterized in that, the corner radius (5) is between 0.01 to 0.4 times of the cutting diameter (1).

6. The end-mill cutter set (A) according to claim 1, characterized in that, the helix angle (10) varies from 28° to 43°, depending on characteristics of a material to be machined.

7. The end-mill cutter set (A) according to claim 1, characterized in that, a gash angle (24) is between 15° to 45° interval.

8. The end-mill cutter set (A) according to claim 1, characterized in that, a dish angle (23) at an opening part of the flutes (9) is between 1° to 3°.

9. The end-mill cutter set (A) according to claim 1, characterized in that, said cutter set (A) comprises a Titanium Aluminium Nitride (TiAlN) coating via a PVD coating.

* * * * *